US011089477B2

(12) United States Patent
Cha et al.

(10) Patent No.: US 11,089,477 B2
(45) Date of Patent: Aug. 10, 2021

(54) METHODS AND APPARATUS FOR OBTAINING A SERVICE

(71) Applicant: Samsung Electronics Co., Ltd., Gyeonggi-do (KR)

(72) Inventors: Sang-ok Cha, Daegu (KR); Yong-gook Park, Gyeonggi-do (KR); Ho-jun Lee, Gyeonggi-do (KR); Tae-young Kang, Seoul (KR); Hee-chul Jeon, Gyeonggi-do (KR); Ju-il Eom, Gyeonggi-do (KR); Joo-yoon Bae, Seoul (KR); Won-young Choi, Gyeonggi-do (KR); Sang-gon Song, Daegu (KR); Kuk-hyun Han, Daejeon (KR); Bum-joo Lee, Gyeonggi-do (KR); Seung-hwan Hong, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/224,148

(22) Filed: Dec. 18, 2018

(65) Prior Publication Data

US 2019/0149992 A1    May 16, 2019

Related U.S. Application Data

(63) Continuation of application No. 13/270,640, filed on Oct. 11, 2011, now abandoned.

(30) Foreign Application Priority Data

Oct. 8, 2010 (KR) .......................... 10-2010-0098499
Sep. 27, 2011 (KR) .......................... 10-2011-0097569

(51) Int. Cl.
*H04W 12/08* (2021.01)
*H04W 48/20* (2009.01)
*H04W 48/00* (2009.01)

(52) U.S. Cl.
CPC ............ *H04W 12/08* (2013.01); *H04W 48/17* (2013.01); *H04W 48/20* (2013.01)

(58) Field of Classification Search
CPC ............................. H04W 48/17; H04W 48/20
See application file for complete search history.

(56) References Cited

U.S. PATENT DOCUMENTS 7,146,130 B2   12/2006   Hsu et al.
7,263,345 B2    8/2007   Kotola et al.
(Continued)

FOREIGN PATENT DOCUMENTS

JP      2008-507749      3/2008
KR      1020090000402    1/2009
(Continued)

OTHER PUBLICATIONS

Mexican Office Action dated Aug. 8, 2013 issued in counterpart application No. MX/a/2013/003876.
(Continued)

*Primary Examiner* — Joe Chacko
(74) *Attorney, Agent, or Firm* — The Farrell Law Firm, P.C.

(57) ABSTRACT

Methods and apparatus are provided for obtaining a service is provided. Information about an external device is received at a terminal from the external device. It is determined whether the external device has been registered based on the information about the external device. Service information associated with the external device is provided when at least the external device has been registered.

19 Claims, 12 Drawing Sheets

(56) References Cited

U.S. PATENT DOCUMENTS

| | | | |
|---|---|---|---|
| 7,596,368 B2 | 9/2009 | Yamada et al. | |
| 7,606,242 B2 | 10/2009 | Whelan et al. | |
| 8,374,631 B2 | 2/2013 | Kall et al. | |
| 2003/0228842 A1* | 12/2003 | Heinonen | H04L 67/04 |
| | | | 455/41.2 |
| 2004/0181692 A1 | 9/2004 | Wild et al. | |
| 2004/0198220 A1 | 10/2004 | Whelan et al. | |
| 2004/0213172 A1 | 10/2004 | Myers et al. | |
| 2005/0177515 A1* | 8/2005 | Kalavade | H04L 63/0892 |
| | | | 705/52 |
| 2006/0045272 A1 | 3/2006 | Ohaka | |
| 2006/0073840 A1 | 4/2006 | Akgun et al. | |
| 2006/0079229 A1 | 4/2006 | Satrusajang et al. | |
| 2006/0168137 A1 | 7/2006 | Lim et al. | |
| 2007/0115886 A1 | 5/2007 | Davis et al. | |
| 2007/0242645 A1* | 10/2007 | Stephenson | H04W 52/0216 |
| | | | 370/338 |
| 2008/0005251 A1 | 1/2008 | Im et al. | |
| 2008/0037482 A1* | 2/2008 | Douglas | H04L 43/08 |
| | | | 370/338 |
| 2008/0082402 A1 | 4/2008 | Turrentine | |
| 2008/0240016 A1 | 10/2008 | Cai | |
| 2008/0285520 A1 | 11/2008 | Forte et al. | |
| 2009/0059848 A1 | 3/2009 | Khetawat et al. | |
| 2009/0064283 A1 | 3/2009 | Chen | |
| 2009/0064299 A1 | 3/2009 | Begorre et al. | |
| 2009/0092111 A1 | 4/2009 | Hom et al. | |
| 2009/0124284 A1 | 5/2009 | Scherzer et al. | |
| 2009/0143018 A1 | 6/2009 | Anderson et al. | |
| 2010/0110921 A1* | 5/2010 | Famolari | H04W 48/17 |
| | | | 370/252 |
| 2010/0274913 A1 | 10/2010 | Ando | |
| 2011/0078236 A1 | 3/2011 | Olsen et al. | |
| 2011/0122858 A1 | 5/2011 | Yashiro et al. | |
| 2012/0022968 A1* | 1/2012 | Manku | G06Q 30/0613 |
| | | | 705/26.41 |
| 2012/0208504 A1 | 8/2012 | Song et al. | |
| 2012/0209934 A1 | 8/2012 | Smedman | |
| 2013/0019298 A1 | 1/2013 | Jover Segura et al. | |
| 2013/0070641 A1* | 3/2013 | Meier | H04W 8/005 |
| | | | 370/254 |
| 2013/0217427 A1* | 8/2013 | Bajko | H04W 16/18 |
| | | | 455/507 |

FOREIGN PATENT DOCUMENTS

| | | |
|---|---|---|
| KR | 1020100078136 | 7/2010 |
| KR | 1020100106441 | 10/2010 |
| WO | WO 2010/037128 | 4/2010 |

OTHER PUBLICATIONS

Mexican Office Action dated Feb. 18, 2014 issued in counterpart application No. MX/a/2013/003876.
Mexican Office Action dated May 27, 2014 issued in counterpart application No. MX/a/2013/003876.
Chinese Office Action dated Aug. 6, 2015 issued in counterpart application No. 201180059329.X, 12 pages.
European Search Report dated Nov. 20, 2014 issued in counterpart application No. 11830959.0-1870.
Korean Office Action dated Feb. 26, 2018 issued in counterpart application No. 10-2011-0097569, 11 pages.

* cited by examiner

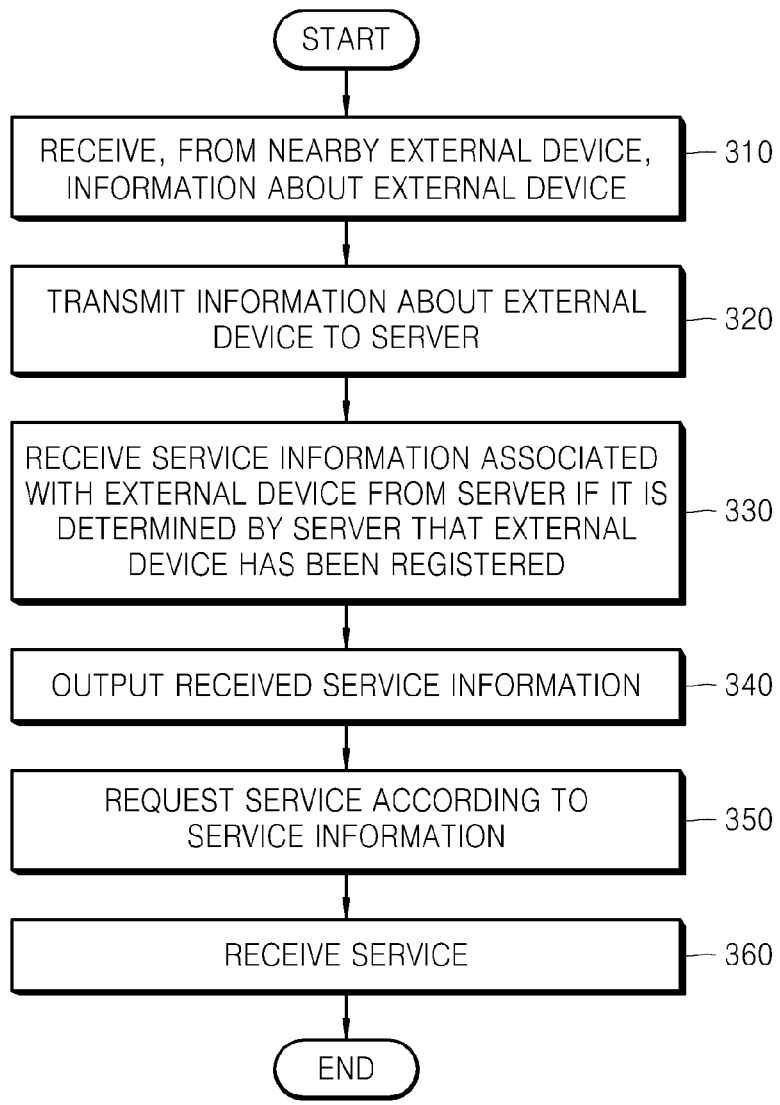

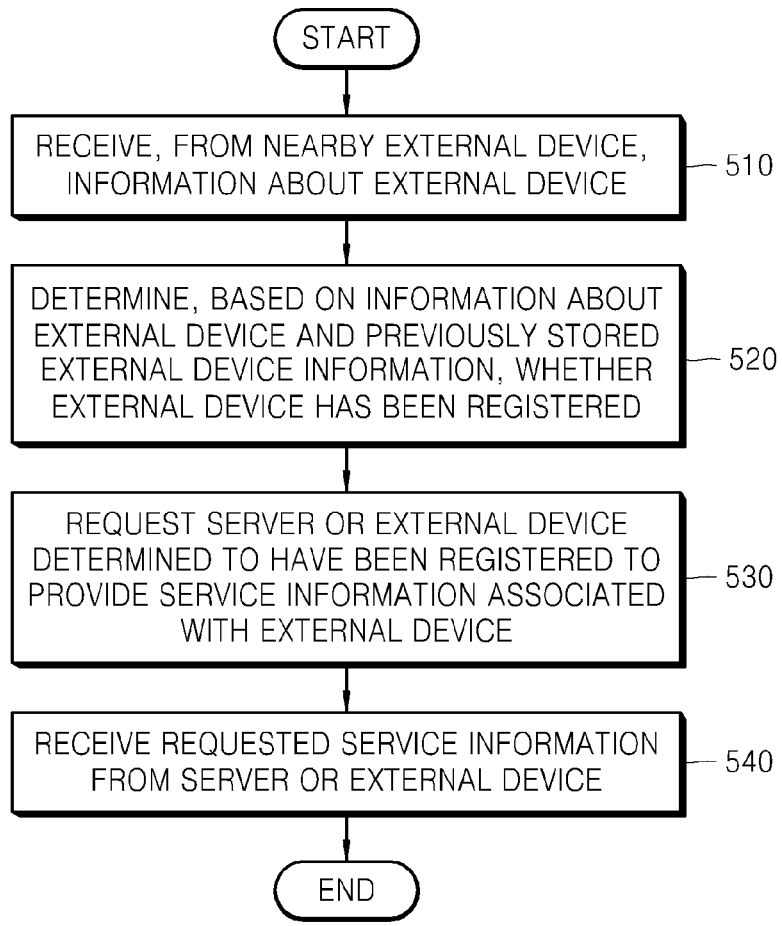

| AP | SERVICE INFORMATION | SERVICE SERVER ADDRESS |
|---|---|---|
| A-001 | STARBUCKS GANG-NAM | www.starbucks.co.kr/gamgnam |
| C-101 | SHINSEGAE GANG-NAM | www.shinsegae.com/gamgnam |
| Y-320 | KYOBO BOOKS GANG-NAM | www.kyobobooks.com/gamgnam |

FIG. 11

| AP | SERVICE INFORMATION | SERVICE SERVER ADDESS | ZONE INFORMATION |
|---|---|---|---|
| A-001 | STARBUCKS GANG-NAM | www.starbucks.co.kr/gamgnam | GANG-NAM A |
| C-101 | SHINSEGAE GANG-NAM | www.shinsegae.com/gamgnam | GANG-NAM A |
| Y-320 | KYOBO BOOK GANG-NAM | www.kyobobooks.com/gamgnam | GANG-NAM B |

METHODS AND APPARATUS FOR OBTAINING A SERVICE

PRIORITY

This application is a Continuation of U.S. application Ser. No. 13/270,640 filed with the U.S. Patent and Trademark Office on Oct. 11, 2011, and claims priority under 35 U.S.C. § 119(a) to Korean Patent Applications 10-2010-0098499 and 10-2011-0097569, filed Oct. 8, 2010 and Sep. 27, 2011, respectively, the disclosures of each which are incorporated herein by reference.

BACKGROUND OF THE INVENTION

1. Field of the Invention

The present invention relates generally to a service method and apparatus, and a server, and more particularly, to a service method and apparatus and a server, in which information about an external device is received to determine whether a service is to be provided to the external device in accordance with registration of the external device.

2. Description of the Related Art

When a terminal accesses a network Access Point (AP) that is capable of providing a Wi-Fi Wireless Local Area Network (WLAN) service, the WLAN service is provided to the terminal. However, due to an increase in WLAN technologies such as Wi-Fi, APs have recently become overrun. Consequently, as a user scans APs in a Wi-Fi zone to sort APs and connect to a desired AP, various problems may occur, which include, for example, authenticity of the desired AP, absence of a way for the user to filter and check multiple scanned APs, inconsistency of a server operating system providing a service or content, and absence of a way to provide interoperability between a service in a region and the service out of that region.

SUMMARY OF THE INVENTION

The present invention has been made to address at least the above problems and/or disadvantages and to provide at least the advantages described below. Accordingly, an aspect of the present invention provides methods and apparatus for obtaining a service.

According to an aspect of the present invention, a method is provided for obtaining a service related to an AP (access point), the method performed by an electronic device and comprising receiving unique information about a plurality of APs from the APs; identifying whether the APs are registered, based on the received unique information; requesting additional information related to the APs from a server, based on identification of the APs being registered; receiving the additional information related to the APs from the server; displaying, on a screen of the electronic device, an AP list including the additional information related to the APs; selecting one of the APs from the AP list; and requesting a service corresponding to the selected AP from a service providing server, with the additional information including region information of places in which the APs are installed.

According to another aspect of the present invention, an electronic device is provided for a service related to an AP (access point) that includes at least one transceiver, a display, a memory storing one or more instructions, and a processor that is configured to execute the one or more instructions to receive unique information about a plurality of APs from the APs; identify whether the APs are registered, based on the received unique information; request additional information related to the APs from a server, based on identification of the APs as being registered; receive the additional information related to the APs from the server; display an AP list including the additional information related to the APs; select one of the APs from the AP list; and request a service corresponding to the selected AP from a service providing server, with the additional information including region information of places in which the APs are installed.

Accordingly to a further aspect of the present disclosure, a non-transitory computer-readable recording medium is provided having recorded thereon a program for causing a computer included in a device to execute the method of receiving unique information about a plurality of access points (APs) from the APs; identifying whether the APs are registered, based on the received unique information; requesting additional information related to the APs from a server, based on identification of the APs being registered; receiving the additional information related to the APs from the server; displaying, on a screen of the electronic device, an AP list including the additional information related to the APs; selecting one of the APs from the AP list; and requesting a service corresponding to the selected AP from a service providing server, wherein the additional information includes region information of places in which the APs are installed.

BRIEF DESCRIPTION OF THE DRAWINGS

The above and other aspects, features and advantages of the present invention will become more apparent from the following detailed description when taken in conjunction with the accompanying drawings, in which:

FIG. 3 is a flowchart illustrating a service method performed in a terminal, according to an embodiment of the present invention;

FIG. 5 is a flowchart illustrating a service method performed in a terminal, according to an embodiment of the present invention;

FIG. 6 is a diagram illustrating previously stored external device information, according to an embodiment of the present invention;

FIG. 11 is a table of registration information and zone information regarding external devices, according to an embodiment of the present invention;

DETAILED DESCRIPTION OF EMBODIMENTS OF THE PRESENT INVENTION

Figure 1:
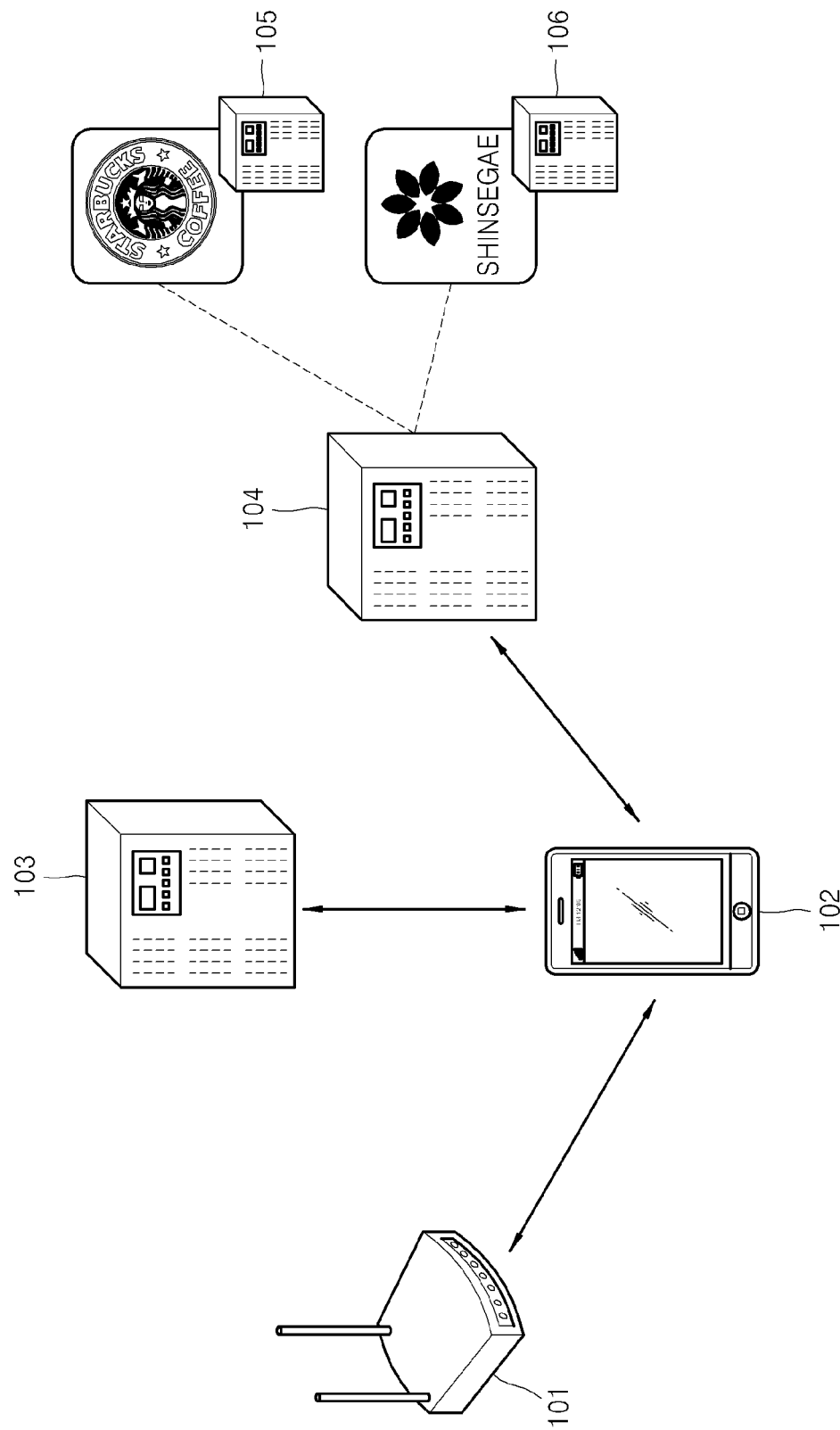
FIG. 1 is a schematic diagram illustrating a service system, according to an embodiment of the present invention.

Embodiments of the present invention are described in detail with reference to the accompanying drawings. The same or similar components are designated by the same or similar reference numerals although they are illustrated in different drawings. Detailed descriptions of constructions or processes known in the art may be omitted to avoid obscuring the subject matter of the present invention.

FIG. 1 is a schematic diagram illustrating a service system, according to an embodiment of the present invention.

Referring to FIG. 1, a service system includes an AP 101, a terminal 102, a registration determination server 103, a service providing server 104, and service providers 105 and 106, which are connected to the service providing server 104. The terminal 102 receives information about the AP 101, which is broadcast from the AP 101. The terminal 102 then transmits the received information about the AP 101 to the registration determination server 103. When it is determined that the AP 101 has been registered as a valid AP, the registration determination server 103 transmits an address of the service providing server 104 to the terminal 102. The terminal 102 then connects to the service providing server 104 according to the received address of the service providing server 104 to receive content or a service. The service providing server 104 may be embodied as the service providers 105 and 106. The foregoing description of FIG. 1 is provided as an example only, and various additional embodiments of the service system are described in greater detail below.

Figure 2:
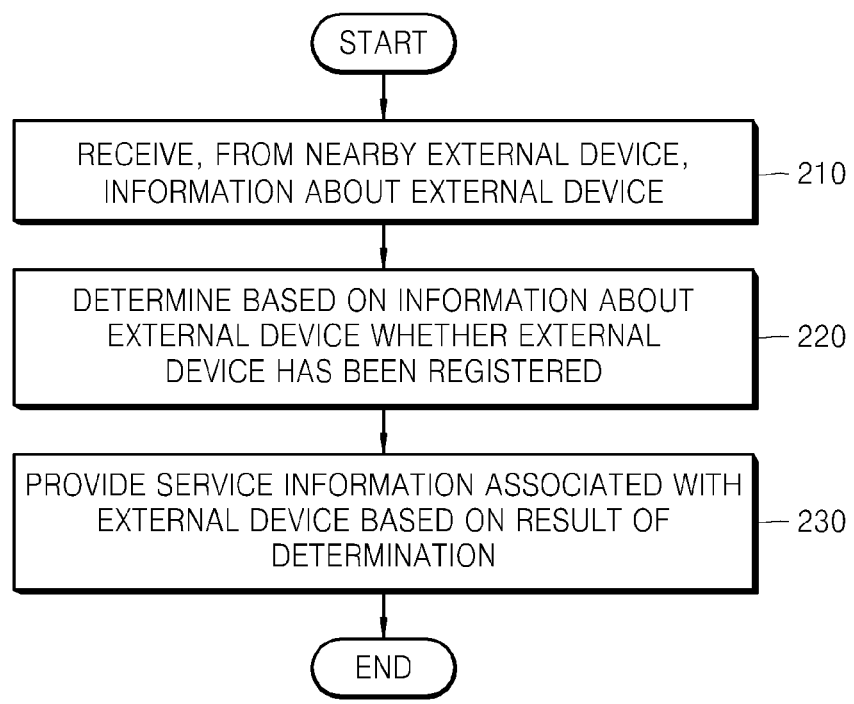
FIG. 2 is a flowchart illustrating a service method, according to an embodiment of the present invention.

FIG. 2 is a flowchart illustrating a service method, according to an embodiment of the present invention.

Referring to FIG. 2, in step 210, a terminal receives information about a nearby external device from the external device. The external device broadcasts predetermined information to a client that is located within a reachable distance. The external device must be in close proximity to the terminal for the terminal to receive the information broadcasted from the external device. In an embodiment of the present invention, the external device is embodied as an AP. In general, an AP refers to a low-power wireless device that acts as a base station in a WLAN. The AP serves as a bridge between a wireless device and a wired device. In a wired network, the AP is attached to a router or a switch, which does not recognize a mobile station. Thus, extension of a wired network to a wireless network is entirely dependent on the AP.

The information about the external device includes unique information of the external device. The unique information specifies the external device. When the external device is an AP, the unique information of the AP includes at least one of a Service Set IDentifier (SSID) and a Media Access Control (MAC) address. The SSID is a connecting IDentifier (ID) between a wireless terminal and the AP, which is used by a service provider to distinguish different wireless cells, e.g., Basic Service Sets (BSSs), in a WLAN. The MAC address refers to a network-specific number of the AP.

The information about the external device may include public information of the external device. The public information is information about the external device that remains aside from the unique information. For example, the public information of the external device may be location information of the external device.

In step 220, the terminal determines whether the external device has been registered, based on the received information about the external device. The terminal may check external device information corresponding to the received information about the external device from list information regarding previously registered external devices. The determination of whether the external device has been registered may be performed by the terminal or an external server connected with the terminal, as is described in greater detail below.

In step 230, the terminal provides service information associated with the external device based on the determination result. If the terminal determines that the external device has been registered, the terminal provides the service information associated with the external device. The service information associated with the external device is information about a service to be provided in association with the external device. The service is a concept including contents. The service information associated with the external device may be address information of a server that provides the service, or advertisement information associated with the external device. When the service information is advertisement information, the service information may include address information of a server that provides an advertisement. For example, when the external device is an AP associated with a coffee shop 'Starbucks', the service information associated with the external device may be server address information of a service or content provider associated with Starbucks or Starbucks advertisement information including the address information.

FIG. 3 is a flowchart illustrating a service method performed in a terminal, according to an embodiment of the present invention.

Referring to FIG. 3, in step 310, the terminal receives information about a nearby external device from the external device. In an embodiment of the present invention, the external device is an AP. The information about the external device includes unique information of the external device. When the external device is an AP, the unique information of the AP includes at least one of an SSID and a MAC address. The information about the external device may include public information of the external device. For example, the public information of the external device may be location information of the external device.

In step 320, the terminal transmits the received information about the external device to a server that determines whether the external device is a valid external device. Specifically, the server determines whether the external device has been registered. The terminal may also transmit information about itself, such as location information, to the server, together with the received information about the external device. The terminal may directly transmit the information about the external device to the server by using a predetermined communication network, such as, for example, a $3^{rd}$-Generation (3G) network. The terminal may also transmit the information about the external device to the server through the external device by using a communication network connected with the external device, which has transmitted the information about itself. For example, if the external device is a WLAN AP, the communication network is a WLAN communication network. However, the transmissions to the server described above are examples only, and the transmission scheme is not limited thereto.

In step 330, after the server determines whether the external device has been registered, the terminal receives service information associated with the external device from the server. The service information associated with the external device refers to information about a service to be provided in association with the external device. Herein, the service is a concept including contents. The service information associated with the external device may be address information of a server that provides the service, or advertisement information associated with the external device. In an embodiment of the present invention, the service information associated with the external device may be received from the external device. The service information associated with the external device may be included in the information about the external device that is transmitted by the external device. If the external device has not been registered, the terminal may request the external device to provide the information about the external device and may receive the provided information about the external device. The determination of whether the external device has been registered at the server will be described in greater detail below.

In step 340, the terminal outputs the received service information associated with the external device. The terminal provides an interface on which the service information associated with the external device is displayed. The terminal may selectively display a valid external device that has been registered.

Figure 4A:
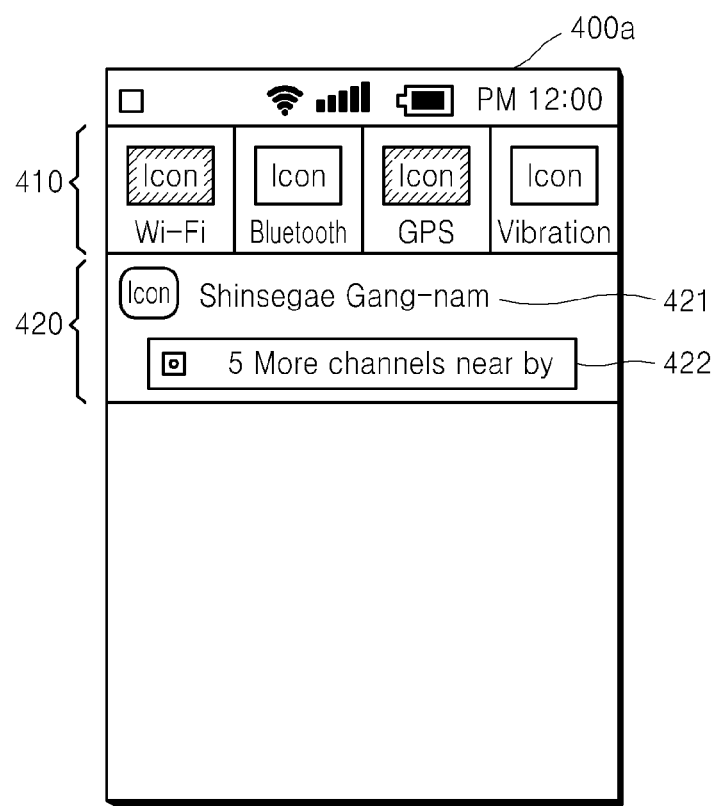
FIG. 4A is a diagram illustrating an interface that displays service information associated with an AP, according to an embodiment of the present invention.

FIG. 4A is a diagram illustrating an interface that displays service information associated with an AP, according to an embodiment of the present invention.

Referring to FIG. 4A, on an interface 400a that displays information associated with an external device (an AP), a region 410 includes icons related to functions of a terminal and a region 420 displays information associated with the AP that has been determined to have been registered. In the region 420, information 421 associated with the AP is displayed, and a button 422 is displayed that indicates that there are other APs, which were determined to have been registered. In FIG. 4A, "Shinsegae Gang-nam" is displayed as the information 421. "5 More Channels Near By" shown on the button 422 indicates that there are five APs, which were determined to have been registered. When a user activates the button 422, information associated with the five APs may be displayed on the interface 400a. According to a predetermined rule, the terminal may display only one AP and the number of other APs. As an example of the predetermined rule, an AP transmitting a signal with the largest strength is preferentially displayed. Information associated with all APs determined to have been registered may be displayed. In an embodiment of the present invention, information associated with the AP, which has been determined to have been registered, may be displayed on a portion of a display of the terminal in the form of a flowing 'ticker'.

To display the received information associated with the external device, the terminal may determine an ID for the external device, map the ID to the information associated with the external device, and output the ID. The ID of the external device may be text information or image information capable of indicating the external device. When the ID of the external device is selected by the user of the terminal, the terminal is connected to a server capable of providing a service based on the mapped information. When the terminal outputs the information associated with the external device, the terminal filters service information according to a predetermined condition, instead of displaying information associated with all external devices determined to have been registered. For example, when the strength of a signal received from the external device is smaller than a predetermined strength, the terminal filters service information. Alternatively, the terminal filters service information based on user information stored in the terminal, such as, for example, user preference. For example, when user preference is designated as 'movie', service information irrelevant to 'movie' is filtered and is not output.

Referring back to FIG. 3, in step 350, when the user selects the output service information associated with the external device, the terminal connects to a server according to an address of the server, which is included in the service information associated with the external device. The terminal requests the server to provide the service. The server provides a service associated with the external device. If the user selects "Shinsegae Gang-nam" which is the service information 421 of the AP, which has been determined to have been registered in FIG. 4A, the terminal requests a server of Shinsegae Gang-nam to provide the service.

In step 360, the terminal receives the requested service or contents associated with that service from the server, which provides the service for the external device.

Figure 4B:
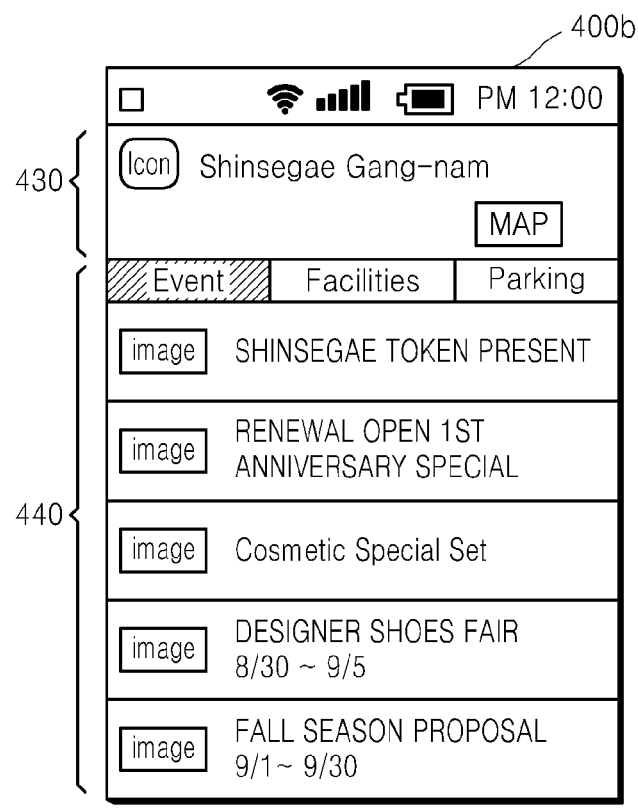
FIG. 4B is a diagram illustrating an interface that displays a service received from a server, according to an embodiment of the present invention.

FIG. 4B is a diagram illustrating an interface that displays a service received from a server, according to an embodiment of the present invention. A region 430 displays service information associated with a selected AP on an interface 400b. A region 440 displays a provided service on the interface 400b.

According to an embodiment of the present invention, a server that provides a service for an external device may be included in a server that determines whether an external device has been registered. In such an embodiment, the terminal requests the server, which determines the registration, to provide a service, and the terminal is provided with the requested service from the server.

According to an embodiment of the present invention, the terminal may transmit information about itself to the server, in addition to the information the terminal received regarding the external device. For example, the information about the terminal may be location information, such as, for example, Global Positioning System (GPS) information of the terminal. In this embodiment, the service information associated with the external device transmitted from the server may further include service information associated with the location information of the terminal. The terminal may transmit identity information of the user of the terminal to the server, in addition to the received information about the external device.

According to an embodiment of the present invention, if the received information about the external device does not meet a prescribed scheme, the terminal may filter the received information about the external device. When the external device is an AP, the prescribed scheme is to apply a specific mark to an SSID field region or to use a particular AP naming rule. For example, when the AP is an AP of Starbucks Gang-nam, an SSID may be set to 'Starbucks_Gang-nam_AP' or 'Starbucks AP_01000010'. The specific mark or AP naming rule may be set by the terminal or providers of the server in accordance with any setting method.

FIG. 5 is a flowchart illustrating a service method at a terminal, according to an embodiment of the present invention.

Referring to FIG. 5, in step 510, the terminal receives information about a nearby external device from the external device. In an embodiment of the present invention, the external device is an AP. The information about the external device includes unique information of the external device. When the external device is the AP, the unique information of the AP includes at least one of an SSID and a MAC address. The information about the external device may include public information of the external device. For example, the public information of the external device may be location information of the external device.

In step 520, the terminal determines whether the external device has been registered based on the received information about the external device and external device information previously stored in the terminal. The previously stored external device information refers to information about external devices that the terminal previously accessed. For example, when the terminal determines that the Starbucks Gang-nam AP has been registered as a valid AP, the terminal stores the Starbucks Gang-nam AP as the valid AP in a log. Afterwards, when the terminal receives a signal from the Starbucks Gang-nam AP, the terminal automatically determines that the Starbucks Gang-nam AP is the valid AP. A difference between FIG. 5 and FIG. 3 is that the terminal, instead of the server, determines whether the external device has been registered in FIG. 5.

FIG. 6 is a diagram illustrating an example of the previously stored external device information, according to an embodiment of the present invention.

Referring to FIG. 6, previously stored list information 600 about external devices is shown. The list information 600 includes information about APs 610, which are the external devices, and information about recent access dates to the APs 620. However, such data fields are provided herein as examples only, and the present invention is not limited thereto. The external device information refers to information about external devices that the terminal previously accessed. Upon receiving information about an AP 'A-001', the terminal determines whether the AP 'A-001' is included in the list information 600, and if the AP 'A-001' is included in the list information 600, the terminal determines that the AP 'A-001' has been registered as a valid AP. Upon receiving information about an AP 'B-004', the terminal determines that the AP 'B-004' is an invalid AP because there is no match information in the list information 600.

Referring back to FIG. 5, in step 530, if the terminal determines that the external device has been registered, the terminal requests the server or the external device to provide service information associated with the external device. The service information associated with the external device refers to information about a service to be provided in association with the external device. The service is a concept including contents. The service information associated with the external device may be address information of a server that provides the service, or advertisement information associated with the external device.

In step 540, the terminal receives the requested service information from the server or the external device. A process after step 540 is the same as steps 350 through 360 of FIG. 3.

Figures 7, 8:
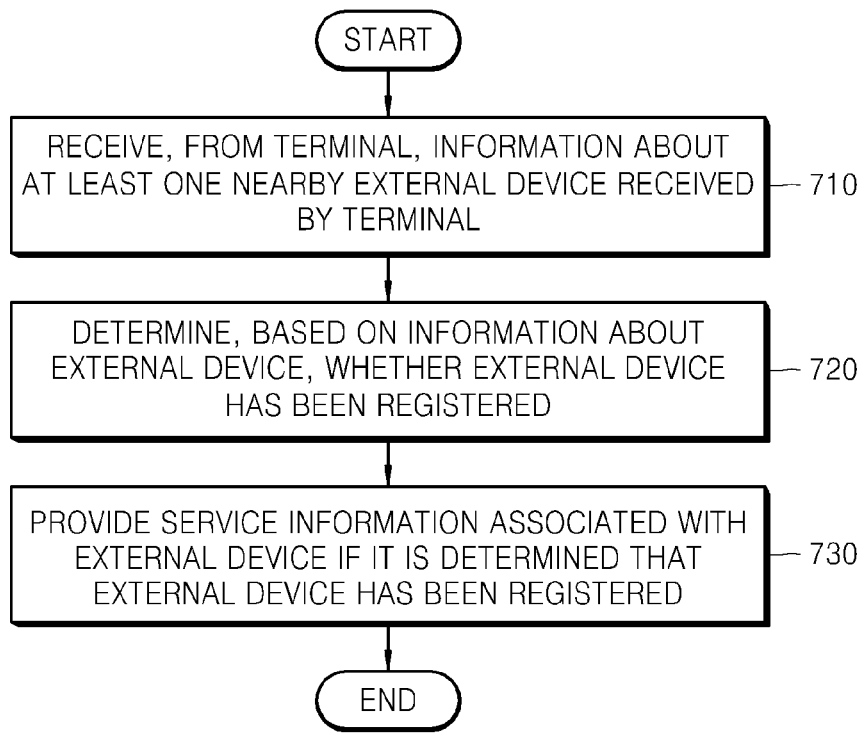
FIG. 7 is a flowchart illustrating a service method performed in a server, according to an embodiment of the present invention.
FIG. 8 is a diagram illustrating external device registration information, according to an embodiment of the present invention.

FIG. 7 is a flowchart illustrating a service method at a server, according to an embodiment of the present invention.

Referring to FIG. 7, in step 710, the server receives information about at least one nearby external device from the terminal. In an embodiment of the present invention, the external device may be an AP. Information about the external device includes unique information of the external device. The unique information refers to information capable of specifying the external device. When the external device is the AP, the unique information of the AP includes at least one of an SSID and a MAC address. For an SSID, a specific mark is applied to an SSID field region or a particular AP naming rule is used. For example, when an AP is an AP of Starbucks Gang-nam, an SSID may be set to 'Starbucks_Gang-nam_AP' or 'Starbucks AP_01000010'. The specific mark or AP naming rule may be set by the terminal or providers of the server in accordance with any setting method. The server may receive the information about the external device from the terminal through the external device.

In step 720, the server determines whether the external device has been registered based on the information about the external device. The server verifies whether the external device is a valid external device capable of providing a service. Specifically, the server compares the information about the external device with external device registration information stored in the server. If the information about the external device is identical to the external device registration information, the server determines that the external device has been registered. The external device registration information refers to information storing a list of external devices, which are determined to have been registered as valid external devices and are to be provided with a service. The registration information may be set by providers of a server, which determine whether the external device has been registered, or which provide a service associated with the external device as described in greater detail below.

FIG. 8 is a diagram illustrating external device registration information, according to an embodiment of the present invention.

Referring to FIG. 8, registration information 800 of external devices may include information about external devices 810 (APs), service information 820, and service server address information 830. However, such data fields are provided as examples only, and the embodiments of the present invention are not limited thereto. Upon receiving information about the AP 'A-001', the server determines that the AP 'A-001' has been registered as a valid server because the AP 'A-001' is included in the registration information 800.

Referring back to FIG. 7, in step 730, when the server determines that the external device has been registered, the server provides service information associated with the external device to the terminal. The service information associated with the external device includes information about a service to be provided in association with the external device. Herein, the service is a concept including contents. The service information associated with the external device may be address information of a server, which provides the service to be provided in association with the external device, or advertisement information associated with the external device. The service information is determined by extracting service information corresponding to the external device from service information included in external device registration information previously stored in the server. The service information may be an address of a server that is to provide a service according to the service information. The server is of a service provider capable of providing the service. For example, in FIG. 8, the service information 820 or the service server address information 830 may be service information associated with the external information. Upon receiving unique information of the AP 'A-001', the server extracts the service information 820 or the service server address information 830 from the registration information 800, and transmits the extracted information to the terminal as the service information associated with the external device. In an embodiment of the present invention, the service includes contents.

In an embodiment of the present invention, it is also possible that the server will not provide the service information associated with the external device to the terminal even though it has been determined that the external device has been registered. Specifically, the server may filter service information according to a predetermined condition and provide the filtered service information. For example, the server may filter received service information according to user information, such as user preference, received from the terminal or previously stored in the server.

According to another embodiment of the present invention, the server may receive services from service providers, and store services corresponding to service information. If the user of the terminal selects service information provided from the server, the server provides a stored corresponding service to the terminal.

According to an embodiment of the present invention, a server that provides a service for an external device may be included in a server, which determines whether an external device has been registered. The terminal requests the server, which determines whether an external device has been registered, to provide a service, and is provided with the requested service from the server.

According to an embodiment of the present invention, the server may receive information about the terminal in addition to received information about an external device. For example, information about the terminal may be location information such as GPS information of the terminal. The server may further include service information associated with the location information of the terminal in addition to service information associated with the external device.

The server may further receive identity information of the user of the terminal in addition to the received information about the external device. When the terminal is a mobile device, the identity information may be a phone number or a serial number of the mobile device.

The server may store for example, a user preference of the user of the terminal, user identity information of the user of the terminal, access history information, such as the number of times the terminal accesses the server to determine whether an external device has been registered, location history information of the terminal, and history information of service use between an external device and the terminal and service use between a service providing server and the terminal. The stored information may be collected for a predetermined time to be used as a use pattern or a connection log of the user. The server provides such information or the use pattern in connection with another server, thereby expanding services or providing marketing information.

Figure 9:
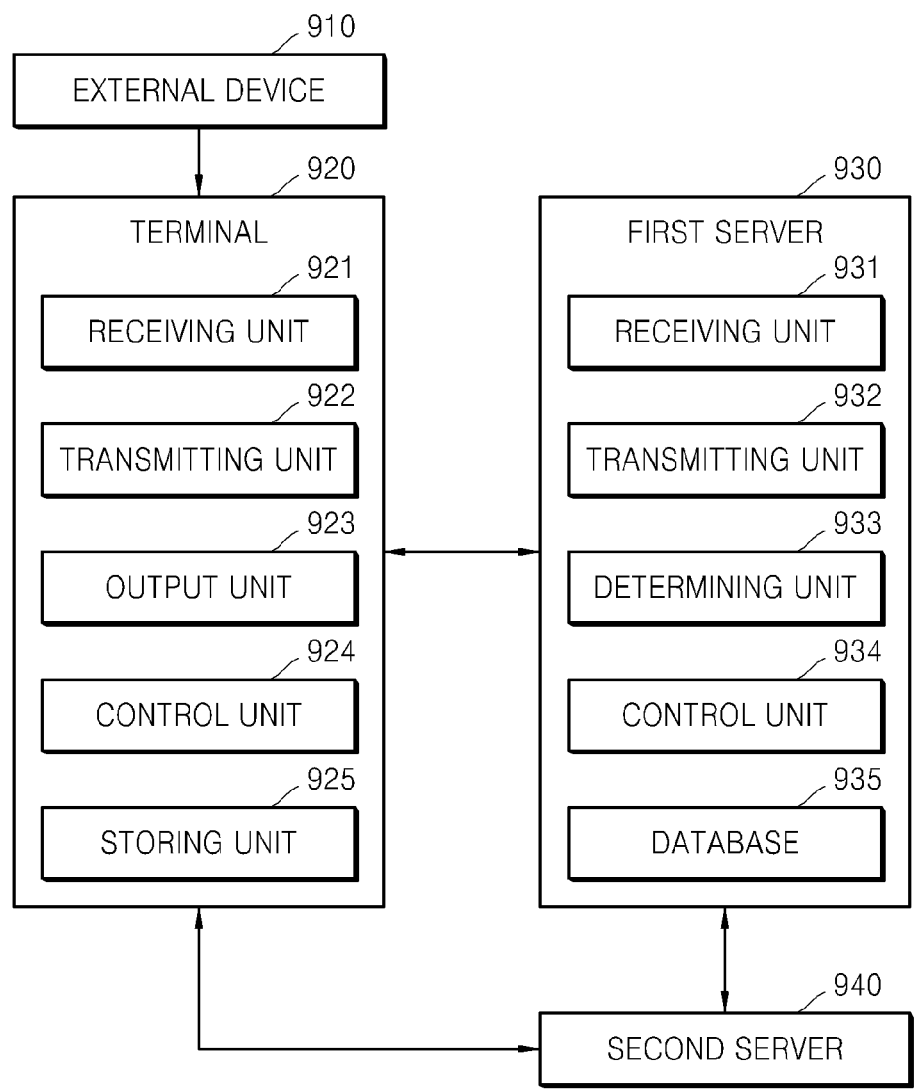
FIG. 9 is a block diagram illustrating a service apparatus and a service server, according to an embodiment of the present invention.

FIG. 9 is a block diagram illustrating a service apparatus and a service server, according to an embodiment of the present invention.

Referring to FIG. 9, a service system includes an external device 910, a terminal 920, a first server 930, and a second server 940. The terminal 920 is a service apparatus. The first server 930 determines whether an external device has been registered. The second server 940 is a service providing server. The terminal 920 includes a receiving unit 921, a transmitting unit 922, an output unit 923, a control unit 924, and a storing unit 925. The first server 930 includes a receiving unit 931, a transmitting unit 932, a determining unit 933, a control unit 934, and a database 935.

The receiving unit 921 of the terminal 920 receives information about a nearby external device 910 from the nearby external device 910. In an embodiment of the present invention, the external device 910 is an AP. The information about the external device 910 includes unique information of the external device 910. The unique information refers to information capable of specifying the external device 910. When the external device 910 is the AP, the unique information of the AP includes at least one of an SSID and a MAC address.

The information about the external device 910 may include public information of the external device 910. For example, the public information of the external device 910 may be location information of the external device 910.

The control unit 924 of the terminal 920 determines, based on the received information about the external device 910, whether the external device 910 has been registered. The terminal 920 checks external device information corresponding to the received information about the external device 910 from list information regarding previously registered external devices. The determination of whether the external device 910 has been registered may be performed by the terminal 920 or by the first server 930 connected with the terminal 920, as described in greater detail below.

The control unit 924 of the terminal 920 may provide service information associated with the external device 910 based on the determination result. If the control unit 924 of the terminal 920 determines that the external device 910 transmitting the information about itself has been registered, the control unit 924 provides the service information associated with the external device 910. The service information associated with the external device 910 refers to information about a service to be provided in association with the external device 910. Herein, the service is a concept including contents. The service information associated with the external device 910 may be address information of the second server 940, or advertisement information associated with the external device 910. When the service information is the advertisement information, the service information may include address information of a server that provides an advertisement. For example, when the external device is an AP associated with a coffee shop 'Starbucks', the service information associated with the external device 910 may be server address information of a service or content provider associated with Starbucks or Starbucks advertisement information including the address information.

According to an embodiment of the present invention, the transmitting unit 922 of the terminal 920 transmits information about the external device 910 to the first server 930. The first server 930 determines whether the external device 910 is a valid external device by determining whether the external device 910 has been registered. The terminal 920 may transmit the information about the external device 910 to the first server 930 by using a predetermined communication network, or may transmit the information about the external device 910 to the first server 930 through the external device 910 by using a communication network connected with the external device 910.

The receiving unit 921 of the terminal 920 receives service information associated with the external device 910 from the first server 930 if the external device 910 is determined to have been registered. The service information associated with the external device 910 refers to information about a service to be provided in association with the external device 910. Herein, the service is a concept including contents. The service information associated with the external device 910 may be address information of the second server 940, which provides a service to be provided in association with the external device 910, or may be advertisement information associated with the external device 910. According to another embodiment of the present invention, the service information associated with the external device 910 may be received from the external device 910. The service information associated with the external device 910 may be included in the information about the external device 910. If the external device 910 is determined to have been registered, the terminal 920 may request the external device 910 to provide the service information and may receive the service information from the external device 910.

According to another embodiment of the present invention, the terminal 920 may determine whether the external device 910 has been registered. The control unit 924 of the terminal 920 may determine whether the external device 910 has been registered, based on the received information about the external device 910 and external device information previously stored in the storing unit 925 of the terminal 920. The external device information previously stored in the storing unit 925 of the terminal 920 is information about external devices the terminal 920 previously accessed. For example, when the terminal 920 determines that the Starbucks Gang-nam AP has been registered as a valid AP, the terminal 920 stores the Starbucks Gang-nam AP in a log. When the terminal 920 receives a signal from the Starbucks Gang-nam AP, the terminal 920 automatically determines the Starbucks Gang-nam AP as the valid AP.

If the terminal 920 determines that the external device 910 has been registered, the control unit 924 of the terminal 920 requests the first server 930 or the external device 910 to provide service information associated with the external device 910 determined to have been registered. The receiving unit 921 of the terminal 920 receives the requested service information from the first server 930 or the external device 910.

After receiving the information associated with the external device 910, the control unit 924 of the terminal 920 outputs the received information associated with the external device 910 through the output unit 923. The control unit 924 of the terminal 920 provides an interface on which the information associated with the external device 910 is displayed. Thus, the control unit 924 of the terminal 920 may selectively display the valid external device 910 through the output unit 923. The control unit 924 of the terminal may display only one AP and the number of other APs according to a predetermined rule. As an example of the predetermined rule, an AP transmitting a signal with the largest strength may be preferentially displayed. Information associated with all APs determined to have been registered may be displayed. In an embodiment of the present invention, the control unit 924 of the terminal 920 may display information associated with the AP on a portion of a display of the terminal in the form of a flowing 'ticker'.

To display the received information associated with the external device 910, the control unit 924 of the terminal 920 may determine an ID for the external device 910, map the ID to the information associated with the external device 910, and output the ID. The ID of the external device 910 may be text information or image information capable of indicating the external device 910. When the ID of the external device 910 is selected by the user of the terminal 920, the terminal 920 is connected to a server capable of providing a service based on the mapped information.

When outputting the information associated with the external device 910, the control unit 924 of the terminal 920 filters service information according to a predetermined condition, instead of displaying information associated with all external devices determined to have been registered. For example, when the strength of a signal received from the external device 910 is smaller than a predetermined strength, the control unit 924 of the terminal 920 filters service information. Alternatively, the control unit 924 of the terminal 920 filters service information based on user information stored in the terminal 920, such as a user preference. For example, when the user preference is designated as 'movie', service information irrelevant to 'movie' is filtered and is not output.

When the user selects the output service information associated with the external device 910, the control unit 924 of the terminal 920 connects to the second server 940 according to an address of the second server 940. The control unit 924 of the terminal 920 requests that the second server 940 provide the service. The second server 940 provides a service associated with the external device 910. The receiving unit 921 of the terminal 920 receives the requested service or contents associated with that service from the second server 940, which provides the service for the external device 910.

According to an embodiment of the present invention, the second server 940, which provides a service for the external device 910, may be included in the first server 930, which determines whether the external device 910 has been registered. In this embodiment, the terminal 920 requests the first server 930 to provide a service and is provided with the requested service from the first server 930.

According to an embodiment of the present invention, the transmitting unit 922 of the terminal 920 may transmit information about the terminal 920 to the first server 930, in addition to the received information about the external device 910. For example, the information about the terminal 920 may be location information, such as, for example, GPS information of the terminal 920. In this embodiment, the service information associated with the external device 910, which is transmitted by the first server 930, may further include service information associated with the location information of the terminal 920. The transmitting unit 922 of the terminal 920 may transmit identity information of the user of the terminal 920 to the first server 930 in addition to the received information about the external device 910.

According to an embodiment of the present invention, if the received information about the external device 910 does not meet a prescribed scheme, the control unit 924 of the terminal 920 may filter the received information about the external device 910. When the external device is an AP, the prescribed scheme is to apply a specific mark to an SSID field region or to use a particular AP naming rule. For example, when an AP is an AP of Starbucks Gang-nam, an SSID may be set to 'Starbucks_Gang-nam_AP' or 'Starbucks AP_01000010'. The specific mark or AP naming rule may be set by the terminal or providers of the server in any setting method.

The receiving unit 931 of the first server 930 receives, from the terminal 920, information about at least one nearby external device 910 which the terminal 920 has received. In an embodiment of the present invention, the external device 910 may be an AP. Information about the external device 910 includes unique information of the external device 910. The unique information refers to unique information capable of specifying the external device 910. When the external device is an AP, the unique information of the AP includes at least one of an SSID and a MAC address. For an SSID, a specific mark is applied to an SSID field region or a particular AP naming rule is used. For example, when an AP is an AP of Starbucks Gang-nam, an SSID may be set to 'Starbucks_Gang-nam_AP' or 'Starbucks AP_01000010'. The specific mark or AP naming rule may be set by the terminal or providers of the server in any setting method. The first server 930 may receive the information about the external device 910 from the terminal 920 through the external device 910.

The determining unit 933 of the first server 930 determines, based on the information about the external device 910, whether the external device 910 has been registered. The determining unit 933 of the first server 930 verifies whether the external device 910 is a valid external device capable of providing a service. More specifically, the determining unit 933 of the first server 930 compares the information about the external device 910 with external device registration information stored in the database 935, and if the information about the external device 910 is identical to the external device registration information, the determining unit 933 of the first server 930 determines whether the external device 910 has been registered. The external device registration information refers to information storing a list of external devices, which are determined to have been registered as valid external devices and are to be provided with a service. The registration information may be set by providers of the first server 930, which determines whether the external device 910 has been registered, or may be set by providers of the second server 940, which provides a service associated with the external device 910.

When it is determined that the external device 910 has been registered, the control unit 934 of the first server 930 provides service information associated with the external device 910 to the terminal 920. The control unit 934 of the first server 930 extracts service information corresponding to the external device 910 determined to have been registered from service information included in the external device registration information previously stored in the database 935 to determine the service information. The service information may be an address of the second server 940 capable of providing a service according to the service information. The second server 940 refers to a server of a service provider capable of providing the service.

In an embodiment of the present invention, it is possible that the control unit 934 of the first server 930 will not provide the service information associated with the external device 910 to the terminal 920 even though it is determined that the external device 910 has been registered. Specifically, control unit 934 of the first server 930 may filter service information according to a predetermined condition and provide the filtered service information. For example, the control unit 934 of the first server 930 may filter received service information according to user information, such as user preference, received from the terminal 920 or previously stored in the database 935.

According to another embodiment of the present invention, the first server 930 may receive services from service providers, and store services corresponding to service information. If the user of the terminal 920 selects service information provided from the first server 930, the first server 930 provides a stored corresponding service to the terminal 920.

According to an embodiment of the present invention, the second server 940, which provides a service for the external device 910, may be included in the first server 930, which determines whether the external device 910 has been registered. In this case, the terminal 920 requests the first server 930, which determines whether the external device 910 has been registered, to provide a service, and is provided with the requested service from the first server 930.

According to an embodiment of the present invention, the receiving unit 931 of the first server 930 may receive information about the terminal 920 in addition to received information about the external device 910. For example, information about the terminal 920 may be location information, such as, for example, GPS information of the terminal 920. In this case, the first server 930 may further include service information associated with the location information of the terminal 920 in addition to service information associated with the external device 910.

According to an embodiment of the present invention, the receiving unit 931 of the first server 930 may further receive identity information of the user of the terminal 920 in addition to the received information about the external device 910. When the terminal 920 is a mobile device, the identity information may be a phone number or a serial number of the mobile device.

The database 935 may store, for example, a user preference of the user of the terminal 920, user identity information of the user of the terminal 920, access history information such as the number of times the terminal 920 accesses the first server 930 to determine whether the external device 910 has been registered, location history information of the terminal 920, and history information of service use between the external device 910 and the terminal 920 and service use between the second server 940 and the terminal 920. The stored information may be collected for a predetermined time to be used as a use pattern or a connection log of the user. The first server 30 provides such information or the use pattern in connection with another server, thereby expanding services or providing marketing information.

An embodiment of the present invention is described with respect to zone information regarding an external device below.

The receiving unit 921 of the terminal 920 receives unique information regarding the external device 910 from the external device 910 adjacent thereto. According to an embodiment of the present invention, the external device 910 may be an AP. If the external device 910 is an AP, the unique information regarding the AP may be an MAC address. According to another embodiment of the present invention, the unique information regarding the AP may be an SSID. The unique information regarding the external device 910 may include public information regarding the external device 910. For example, the public information regarding the external device 910 may be location information regarding the external device 910.

The control unit 924 of the terminal 920 transmits a signal requesting determining whether the external device 910 has been registered and a signal requesting zone information regarding the external device 910, to the first server 930, via the transmitting unit 922. The signal requesting determination of whether the external device 910 has been registered, includes the unique information regarding the external device 910. The first server 930 determines whether the external device 910 that transmits the unique information thereof is valid, i.e., whether the external device 910 has been registered, and checks the zone information regarding the external device 910. The terminal 920 may directly transmit the unique information regarding the external device 910 to the first server 930 via a communication network, e.g., a 3G network, or may transmit the unique information to the first server 930 via a communication network connected to the external device 910, e.g., a WLAN when the external device 910 is a WLAN AP. However, the embodiments of the present invention are not limited thereto and different methods of transmitting the unique information to the first server 930 may be utilized.

The determining unit 933 of the first server 930 determines whether the external device 910 has been registered, based on the unique information regarding the external device 910. The first server 930 verifies whether the external device 910 is a valid external device capable of providing a service. Specifically, the determining unit 933 of the first server 930 compares the unique information regarding the external device 910 with registration information regarding the external device 910 stored in the first server 930, and determines that the external device 910 has been registered when the unique information is the same as the registration information. The registration information includes a list of external devices that have been registered as valid external devices and that may provide services. The registration information may be set either by providers of the first server 930 that determines whether the external device 910 has been registered or providers who provide services related to the external device 910. Also, the determining unit 933 of the first server 930 may check the zone information regarding the external device 910, based on the unique information regarding the external device 910. The database 935 of the first server 930 has stored zone information corresponding to the unique information regarding the external device 910.

If it is determined that the external device 910 has been registered, the control unit 934 of the first server 930 provides service information related to the external device 910 and zone information corresponding to the service information to the terminal 920 via the transmitting unit 932. The service information related to the external device 910 includes information regarding services to be provided in association with the external device 910. The term 'services' is a concept including contents. The service information related to the external device 910 may be address information regarding the first server 930 that provides the services in association with the external device 910 or may be advertisement information related to the external device 910. The service information is obtained by extracting service information corresponding to the external device 910 that has been registered from among service information included in the registration information regarding the external device 910 stored in the database 935 of the first server 930. The service information may be the address of the first server 930 that provides services according to the service information. The first server 930 that provides services is a server of a service provider that can provide the services.

The control unit 924 of the terminal 920 confirms the received zone information, based on a selection signal from a user. Specifically, if the zone information is related to a service that a user desires to receive, then the control unit 924 confirms the received zone information, based on a selection from the user in the terminal 920.

The control unit 924 of the terminal 920 outputs only information related to the external device 910 corresponding to the confirmed zone information via the output unit 923.

An embodiment of the present invention related to a server and zone information related to an external device is described below.

The receiving unit 931 of the first server 930 receives zone information selected by a user from the terminal 920. If the user confirms zone information regarding an AP, which is received via the terminal 920, then the terminal 920 transmits the confirmed zone information to the first server 930. Then, the database 935 of the first server 930 stores the confirmed zone information.

The receiving unit 931 of the first server 930 receives a request for a determination as to whether the external device 910 has been registered, from the terminal 920. The first server 930 determines whether the external device 910 transmitting unique information thereof is valid by determining whether the external device 910 has been registered, and checks zone information regarding the external device 910. The terminal 920 may directly transmit information regarding the external device 910 to the first server 930 via a predetermined communication network, or may transmit the information regarding the external device 910 to the first server 930 via a communication network connected to the external device 910, but the embodiments of the present invention are not limited thereto.

The determining unit 933 of the first server 930 determines whether the external device 910 has been registered, based on the unique information. The determining unit 933 verifies whether the external device 910 is a valid device capable of providing services. Specifically, the determining unit 933 compares the unique information of the external device 910 with the registration information regarding the external device 910 stored in the database 935 of the first server 930, and determines that the external device 910 has been registered, when the unique information is the same as the registration information. The registration information includes a list of external devices that have been registered as valid external devices and that may provide services. The registration information may be set either by providers of the first server 930 that determines whether the external device 910 has been registered or providers who provide services related to the external device 910. Also, the first server 930 may check the zone information regarding the external device 910, based on the unique information regarding the external device 910. The database 935 of the first server 930 has stored the zone information corresponding to the unique information regarding the external device 910.

After registration of the external device 910 has been determined, the determining unit 933 of the first server 930 compares the confirmed zone information with the zone information regarding the external device 910 that has been registered. The zone information of the external device 910 that has been registered may be obtained by extracting zone information stored based on the zone information of the external device 910.

If the zone information of the external device 910 is the same as the confirmed zone information, then the server 930 of the control unit 934 provides the service information related to the external device 910 to the terminal 920. The service information related to the external device 910 includes information regarding services to be provided in association with the external device 910. The term, 'services' is a concept including contents. The service information related to the external device 910 may be address information regarding the first server 930 that provides the services in association with the external device 910, or may be advertisement information related to the external device 910. The service information is obtained by extracting service information corresponding to the external device 910 that has been registered from among service information included in the registration information regarding the external device 910, stored in the database 935 of the first server 930. The service information may be the address of the first server 930 that provides services according to the service information. The first server 930 that provides services is a server of a service provider who can provide the services. According to an embodiment of the present invention, a service includes contents. According to an embodiment of the present invention, the first server 930 determines whether the external device 910 has been registered, and then checks zone information regarding the external device 910. However, according to another embodiment of the present invention, the first server 930 may check zone information regarding the external device 910 and then determine whether the external device 910 has been registered.

Specifically, the first server 930 provides a service to the terminal 920 only when the external device 910 has been registered and the zone information of the external device 910 is the same as zone information selected by the user. Otherwise, the first server 930 does not provide a service to the terminal 920, e.g., when the external device 910 is not registered or the zone information of the external device 910 is not the same as the zone information selected by the user. In other words, when the above two conditions are not satisfied, the service is filtered. The other methods related to a service providing method, according to an embodiment of the present invention, are as described above with reference to FIGS. 1 to 8.

Figure 10:
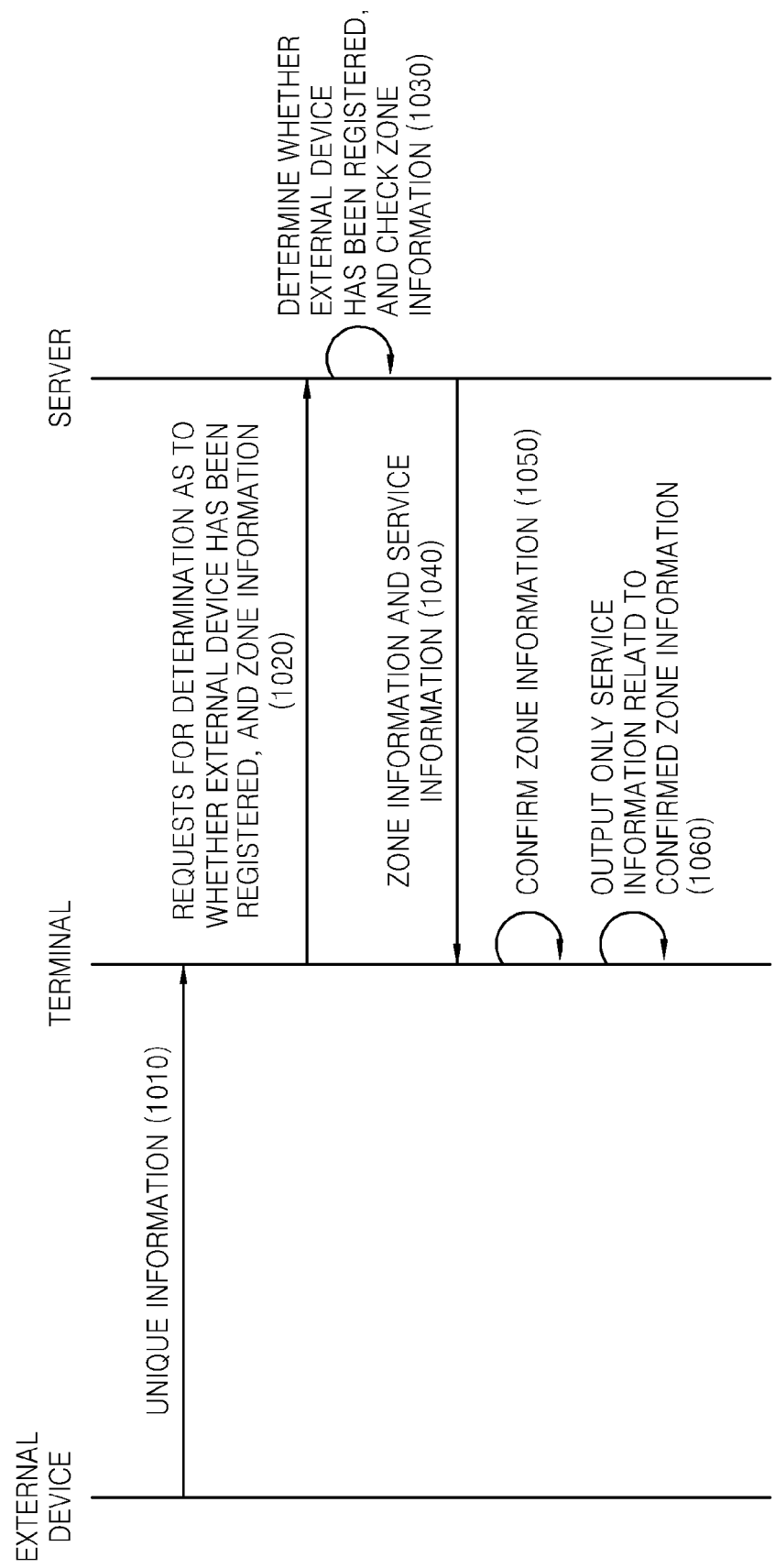
FIG. 10 is a flowchart illustrating a service method, according to an embodiment of the present invention.

FIG. 10 is a flowchart illustrating a service method, according to another embodiment of the present invention. Referring to FIG. 10, in step 1010, a terminal receives unique information regarding an external device adjacent thereto from the external device. According to an embodiment of the present invention, the external device may be an AP. If the external device is an AP, then unique information regarding the AP may be a MAC address. According to another embodiment of the present invention, the unique information regarding the AP may be an SSID. The unique information may include public information regarding the external device. For example, the public information may be location information regarding the external device.

In step 1020, the terminal transmits a signal requesting a determination as to whether the external device has been registered, and a signal requesting zone information regarding the external device, to a server. The signal requesting a determination includes unique information regarding the external device. The server determines whether the external device transmitting the unique information thereof is valid by determining whether the external device has been registered, and checks the zone information regarding the external device. The terminal may directly transmit information regarding the external device to the server via a predetermined communication network thereof, or may transmit the information regarding the external device to the server via a communication network connected to the external device.

In step 1030, the server determines whether the external device has been registered, based on the unique information. The server compares the unique information of the external device with registration information regarding the external device stored in the server, and determines that the external device has been registered when the unique information is the same as the stored registration information. The registration information regarding the external device includes a list of external devices that have been determined to be valid external devices. The registration information may be set by providers of the server that determines whether the external device has been registered, or may be set by providers of services related to the external device. The server may check zone information regarding the external device, based on the unique information of the external device. The server has stored zone information corresponding to the unique information of the external device.

FIG. 11 is a table showing registration information 1100 and examples of zone information 1140 regarding external devices, according to an embodiment of the present invention. Referring to FIG. 11, the registration information 1100 may include information regarding APs that are external devices 1110, service information 1120, service server addresses 1130, and the zone information 1140, however, the embodiments of the present invention are not limited thereto. When information regarding an AP 'A-001' is received, the AP 'A-001' is defined in the registration information 1100, and thus, a server determines that the AP 'A-001' has been registered as a valid AP and that zone information regarding the AP 'A-001' is 'Gang-nam A'.

Referring back to FIG. 10, in step 1040, when it is determined that the external device has been registered, the server provides the terminal with service information related to the external device and checked zone information. The service information related to the external device includes information regarding services to be provided in association with the external device. The service information related to the external device may be address information regarding the server that provides the services, or may be advertisement information related to the external device. The service information is obtained by extracting service information corresponding to the external device that has been registered from among service information included in the registration information regarding the external device stored in the server. The service information may be the address of the server that provides services according to the service information. The server that provides services is a server of a service provider that can provide the services. Referring to FIG. 11, the service information 1120 or the service server addresses 1130 may be the service information related to the external device, and 'Gang-nam A' is zone information regarding the external device. If the server receives unique information regarding the AP 'A-001', the server extracts the service information 1120 or the service server addresses 1130, and the zone information 1140 from the registration information 1100, and transmits the extracted information as the service information related to the external device to the terminal.

In step 1050, the terminal confirms the received zone information, based on a selection signal from a user. Specifically, if the received zone information is related to a service that the user desires to receive, then the terminal confirms the received zone information, based on the user's selection.

Figure 12:
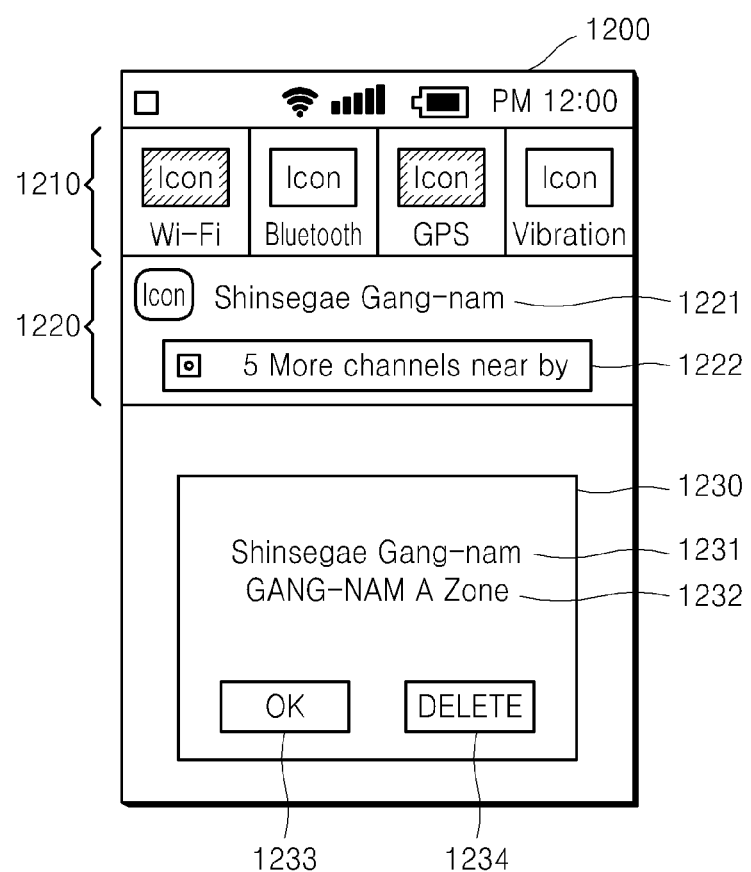
FIG. 12 is a diagram illustrating an interface through which a user's confirmation is received, according to an embodiment of the present invention.

FIG. 12 is a diagram illustrating an interface 1200 via which a user's confirmation is received, according to an embodiment of the present invention. Referring to FIG. 12, a region 1210 displays service information regarding a selected AP, a region 1220 displays a provided service, and a user zone selection region 1230 is provided. Referring to FIG. 12, 'Shinsegae Gang-nam' is displayed as information 1221 related to an AP that has been registered. '5 More channels near by' displayed on a button 1222 indicating that there are other APS that have been registered means that other five APs have been further registered. In the user zone selection region 1230, 'Shinsegae Gang-nam' 1231 that is received information related to the AP, 'Gang-nam A Zone' 1232 that is zone information, a 'Confirm' button 1233, and a 'Delete' button 1234 are displayed. If a user selects the 'Confirm' button 1233, it means that the user confirms the 'Gang-nam A Zone' 1232. If the user selects the 'Delete' button 1234, then the received service information is removed.

Referring again to FIG. 10, in step 1060, the terminal outputs only information related to external devices corresponding to the confirmed zone information. Referring to FIG. 12, if the user confirms the 'Gang-nam A Zone' 1232, then the terminal displays only information related to APs corresponding to the 'Gang-nam A Zone' 1232 in the button 1222 indicating that there are other APS that have been registered.

Figure 13:
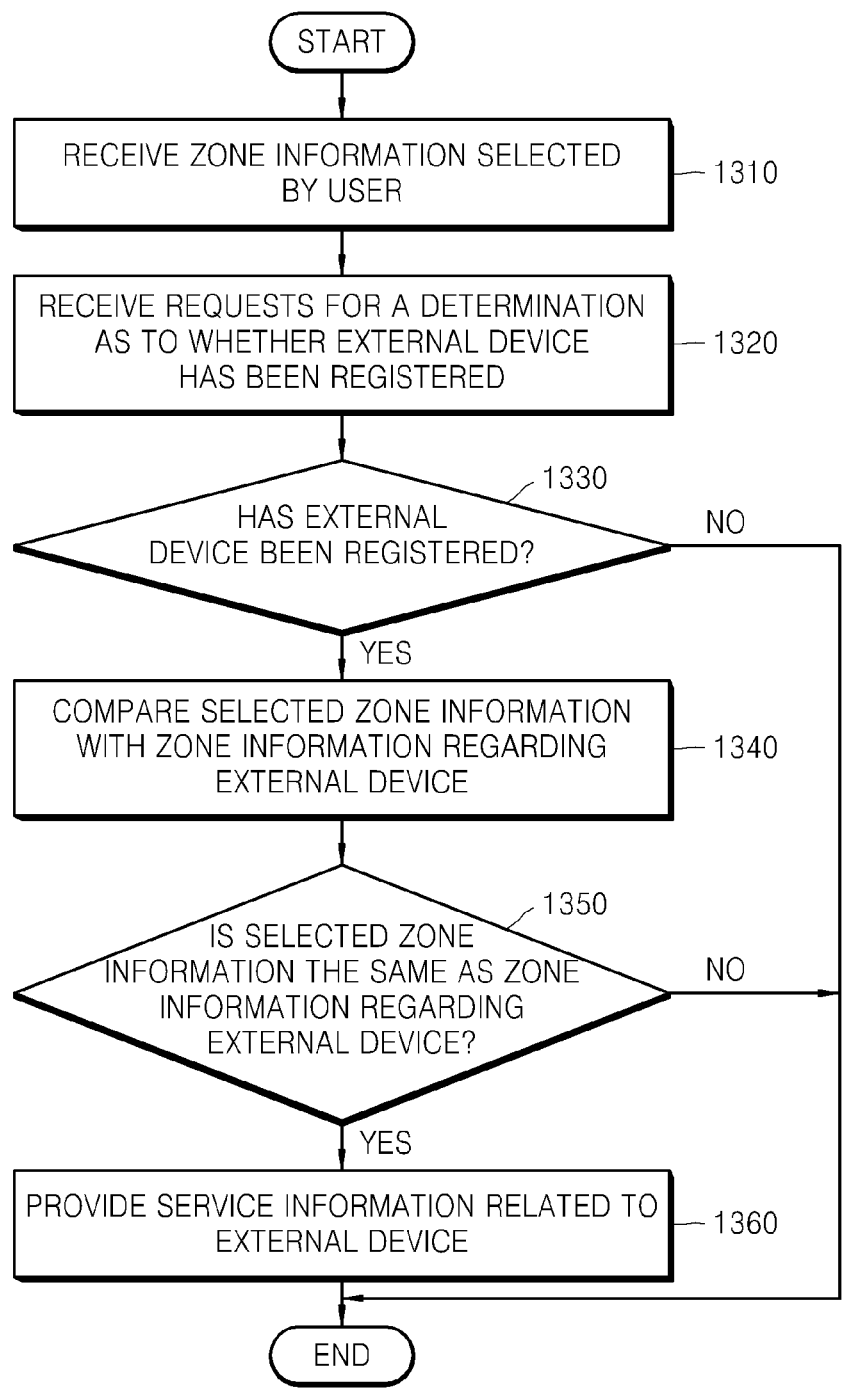
FIG. 13 is a flowchart illustrating a service method performed in a server, according to an embodiment of the present invention.

FIG. 13 is a flowchart illustrating a service method performed in a server, according to an embodiment of the present invention. Referring to FIG. 13, in step 1310, the server receives zone information selected by a user from a terminal. Referring to FIG. 10, when a user confirms zone information regarding an AP received from the terminal, the terminal transmits the confirmed zone information to the server. Then, the server stores the received zone information.

In step 1320, the server receives a signal requesting a determination as to whether an external device has been registered, from the terminal. According to an embodiment of the present invention, the external device may be an AP. The signal requesting a determination as to whether the external device has been registered, includes unique information regarding the external device. If the external device is an AP, the unique information regarding the AP may be a MAC address. According to an embodiment of the present invention, the unique information regarding the AP may be an SSID. The server determines whether the external device transmitting the unique information thereof is a valid external device, i.e., whether the external device has been registered, and checks zone information regarding the external device. The terminal may directly transmit the unique information regarding the external device to the server via a communication network thereof, or may transmit the unique information to the first server 930 via a communication network connected to the external device.

In step 1330, the server determines whether the external device has been registered, based on the unique information regarding the external device. The server verifies whether the external device is a valid external device. Specifically, the server compares the unique information of the external device with registration information regarding the external device stored in the server, and determines that the external device has been registered when the unique information is the same as the stored registration information. The registration information regarding the external device includes a list of external devices that have been determined to be valid external devices and to provide services. The registration information may be set by providers of the server that determines whether the external device has been registered or may be set by providers who provide services related to the external device. Also, the server may check zone information regarding the external device, based on the unique information of the external device. The server has stored zone information corresponding to the unique information of the external device. The method proceeds to step 1340 when it is determined that the external device has been registered, and the method terminates when it is determined that the external device is not registered.

In step 1340, the server compares the confirmed zone information with the zone information regarding the external device that has been registered, when it is determined that the external device has been registered. The zone information regarding the external device that has been registered is obtained by extracting stored zone information, based on the unique information of the external device. For example, referring to FIG. 11, if the external device is the AP 'A-001', then the server extracts the 'Gang-nam A' as the zone information. Then, the server compares the zone information received in operation 1310 with the extracted zone information.

In step 1350, it is determined whether the confirmed zone information is the same as the extracted zone information. The method proceeds to step 1360 when the confirmed zone information and the extracted zone information are the same, and the method terminates when the confirmed zone information and the extracted zone information are not the same. The method of FIG. 13 is performed by sequentially performing operations 1330, 1340, and 1350 but may be performed by sequentially performing operations 1340, 1350, and 1330.

In step 1360, when it is determined that the confirmed zone information and the extracted zone information are the same, the server provides service information related to the external device to the terminal. The service information related to the external device is information regarding services to be provided in association with the external device. The service information related to the external device may be address information regarding the server that provides the services related to the external device or may be advertisement information related to the external device. The service information is obtained by extracting service information corresponding to the external device that has been registered from among service information included in the registration information regarding the external device stored in the server. The service information may be the address of the server that provides services according to the service information. The server that provides services is a server of a service provider that can provide the services.

More specifically, only when the external device has been registered and the zone information of the external device is the same as the zone information selected by the user, does the server provide a service to the terminal. Otherwise, for example, when it is determined in operation 1330 that the external device is not registered, or when it is determined in operation 1350 that the zone information of the external device is not the same as the zone information selected by the user, then the server does not provide a service to the terminal. When the above two conditions are not satisfied, the service is filtered. The other methods related to a service providing method according to an embodiment of the present invention are as described above with reference to FIGS. 1 to 9.

The embodiments of the present invention described above may be embodied as a computer-readable code on a computer-readable recording medium, which when ready to be utilized, are loaded in part or in whole and executed by a Central Processing Unit (CPU). The recording medium may be all kinds of recording devices storing data that is readable by a computer. Examples of the recording medium include Read-Only Memory (ROM), Random Access Memory (RAM), Compact Disk (CD)-ROMs, magnetic tapes, floppy disks, optical data storage devices, and carrier waves such as transmissions over the Internet. The computer-readable recording medium can also be distributed over a network of coupled computer systems so that the computer-readable code is stored and executed in a decentralized fashion. Function programs, code, and code segments for implementing the service method may be easily derived by programmers of ordinary skill in the art.

While the present invention has been shown and described with reference to certain embodiments thereof, it will be understood by those of ordinary skill in the art that various changes in form and detail may be made therein without departing from the spirit and scope of the present invention as defined by the appended claims.

What is claimed is:

1. A method for obtaining a service related to an access point (AP), the method performed by an electronic device and comprising:
receiving unique information about APs from the APs;
transmitting location information of the electronic device to the APs;
identifying whether the APs are registered, based on the received unique information;
requesting advertisement information of service providers corresponding to the APs from the APs, based on identification of the APs being registered;
receiving the advertisement information of the service providers corresponding to the APs from the APs, based on the transmitted location information corresponding to region information of stores in which the APs are installed;
displaying, on a screen of the electronic device, an AP list including the advertisement information of the service providers corresponding to the APs, wherein the advertisement information in the AP list includes identification information of the service providers corresponding to the APs and map information for indicating places in which the APs are installed;
selecting one of the APs from the AP list; and
requesting a service corresponding to the selected AP from a service providing server.

2. The method of claim 1, wherein the identifying comprises:
transmitting, to the APs, the received unique information about the APs; and
receiving, from the APs, a determination result which indicates whether the APs are registered.

3. The method of claim 2, wherein the receiving the determination result comprises receiving the determination result determined by the APs by comparing the transmitted unique information and preregistered unique information of the APs.

4. The method of claim 3, wherein the preregistered unique information of the APs is prestored in the APs and is matched with the electronic device.

5. The method of claim 3, further comprising:
filtering the preregistered unique information of the APs based on a predetermined condition; and
displaying, on the screen of the electronic device, at least one AP among the APs corresponding to the predetermined condition.

6. The method of claim 1, further comprising:
selecting a portion of the received advertisement information; and
generating the AP list by using the selected portion of the received advertisement information.

7. The method of claim 6, wherein the portion of the received advertisement information is selected based on intensities of signals received from the APs.

8. The method of claim 6, wherein the portion of the received advertisement information is selected based on a user preference of the electronic device.

9. The method of claim 1, wherein the unique information is received by controlling a first transceiver of the electronic device, and
wherein the advertisement information is requested by controlling a second transceiver of the electronic device.

10. An electronic device for a service related to an access point (AP) comprising:
at least one transceiver;
a display;
a memory storing one or more instructions; and
a processor configured to execute the one or more instructions to:
receive unique information about APs from the APs;
transmit location information of the electronic device to the APs;
identify whether the APs are registered, based on the received unique information;
request advertisement information of service providers corresponding to the APs from the APs, based on identification of the APs as being registered;
receive the advertisement information of the service providers corresponding to the APs from the APs, based on the transmitted location information corresponding to region information of stores in which the APs are installed;
display an AP list including the advertisement information of the service providers corresponding to the APs;
select one of the APs from the AP list; and
request a service corresponding to the selected AP from a service providing server,
wherein the advertisement information in the AP list includes identification information of the service providers corresponding to the APs and map information for indicating places in which the APs are installed.

11. The electronic device of claim 10, wherein the processor executes the one or more instructions to:
transmit, to the APs, the received unique information about the APs; and
receive, from the APs, a determination result which indicates whether the APs are registered.

12. The electronic device of claim 11, wherein the processor executes the one or more instructions to receive the determination result determined by the APs by comparing the transmitted unique information and preregistered unique information of the APs.

13. The electronic device of claim 12, wherein the preregistered unique information of the APs is prestored in the APs and is matched with the electronic device.

14. The electronic device of claim 12, wherein the processor executes the one or more instructions to:
filter the preregistered unique information of the APs based on a predetermined condition; and
display, on the screen of the electronic device, at least one AP among the APs corresponding to the predetermined condition.

15. The electronic device of claim 10, wherein the processor executes the one or more instructions to:
select a portion of the received advertisement information; and
generate the AP list by using the selected portion of the received advertisement information.

16. The electronic device of claim 15, wherein the portion of the received advertisement information is selected based on intensities of signals received from the APs.

17. The electronic device of claim 15, wherein the portion of the received advertisement information is selected based on a user preference of the electronic device.

18. A non-transitory computer-readable recording medium having recorded thereon a program for causing a computer included in a device to execute the method of:

receiving unique information about access points (APs) from the APs;

transmitting location information of the electronic device to the APs;

identifying whether the APs are registered, based on the received unique information;

requesting advertisement information of service providers corresponding to the APs from the APs, based on identification of the APs being registered;

receiving the advertisement information of the service providers corresponding to the APs from the APs, based on the transmitted location information corresponding to region information of stores in which the APs are installed;

displaying, on a screen of the electronic device, an AP list including the advertisement information of the service providers corresponding to the APs;

selecting one of the APs from the AP list; and requesting a service corresponding to the selected AP from a service providing server, wherein the advertisement information in the AP list includes identification information of the service providers corresponding to the APs and map information for indicating places in which the APs are installed.

19. A method for obtaining a service related to an access point (AP), the method performed by an electronic device and comprising:

receiving information about APs from the APs;

transmitting location information of the electronic device to the APs, identifying whether an AP is registered, based on the received information;

requesting advertisement information of service providers corresponding to the AP from the APs, based on the AP being registered; and receiving the advertisement information of the service providers corresponding to the AP from the APs, based on the transmitted location information corresponding to region information of stores in which the APs are installed, wherein determining whether the AP has been registered is performed by an external server, and wherein the advertisement information in the AP list includes identification information of the service providers corresponding to the APs and map information for indicating places in which the APs are installed.

* * * * *